United States Patent
Bosen

(10) Patent No.: US 8,366,379 B2
(45) Date of Patent: Feb. 5, 2013

(54) TURBOMACHINE WITH FAILURE PROTECTION

(75) Inventor: Werner Bosen, Cologne (DE)

(73) Assignee: ATLAS Copco Energas GmbH, Cologne (DE)

( * ) Notice: Subject to any disclaimer, the term of this patent is extended or adjusted under 35 U.S.C. 154(b) by 752 days.

(21) Appl. No.: 12/615,537

(22) Filed: Nov. 10, 2009

(65) Prior Publication Data

US 2010/0119354 A1 May 13, 2010

(30) Foreign Application Priority Data

Nov. 12, 2008 (DE) .......................... 10 2008 056 851

(51) Int. Cl.
*F01D 21/04* (2006.01)
*F01D 21/14* (2006.01)

(52) U.S. Cl. ............... 415/14; 416/31; 416/43; 417/407

(58) Field of Classification Search ................ 415/9, 14, 415/18, 104, 107, 123, 229, 168.1–168.4, 415/170.1, 174.4, 174.1; 416/2, 31, 32, 43, 416/169 R; 417/407

See application file for complete search history.

(56) References Cited

U.S. PATENT DOCUMENTS 6,517,311 B2 * 2/2003 Funke ........................... 415/106
6,616,423 B2 * 9/2003 Bosen ........................... 417/365

* cited by examiner

*Primary Examiner* — Edward Look
*Assistant Examiner* — Woody A Lee, Jr.
(74) *Attorney, Agent, or Firm* — Andrew Wilford

(57) ABSTRACT

A turbomachine has a housing, a rotor shaft extending along and rotatable about an axis in the housing, and a pair of axially spaced axial-thrust bearings in the housing carrying the shaft and normally only permitting a predetermined small axial displacement of the shaft in the housing. An impeller is rotationally fixed on the shaft. An axially fixed transmission gear is rotationally coupled to the shaft and has an axially directed gear face. A collar fixed axially on the shaft has an axially directed collar face confronting the gear face and normally spaced from the gear face by a clearance equal to more than the predetermined axial displacement. Thus on failure of one of the bearings and axial overtravel of the shaft the gear face and collar face engage each other and limit axial movement of the shaft.

13 Claims, 2 Drawing Sheets

TURBOMACHINE WITH FAILURE PROTECTION

FIELD OF THE INVENTION

The present invention relates to a turbomachine. More particularly this invention concerns a compressor with integral gearing.

BACKGROUND OF THE INVENTION

A turbomachine with integral gearing has a housing holding a shaft carrying both an impeller and a transmission input gear. Typically there are two such impellers axially flanking the gear so that axial forces are somewhat balanced. Axial-thrust bearings support the shaft and impellers in the housing. Such a device can be used as a turbocompressor or expansion turbine.

The turbocompressor rotor is driven by an integral gear transmission, while an expansion turbine rotor drives via an integral gear transmission either a load formed by a generator that is coupled to a large-diameter transmission gear or drives further turbocompressor rotors mounted around the common gear. The meshing teeth of the gears run obliquely to their rotation axis, generate when transmitting torque an axial force that must be countered in order to ensure meshing of the gears. At the same time, flow over the impellers generates axial forces that must be countered. As a rule, the axial forces are transmitted through the shafts on which the gears and impellers are attached to axial bearings and thence to the housing. The bearings that brace the rotor axially of the drive gear have a certain clearance.

If an axial force that is too strong acts on the axial bearings, the clearance is exceeded and axial bracing fails. This can lead to serious damage to the turbomachine, that is when the impeller blades brush against the closely adjacent mating surfaces of the housing. Contact between the impeller and housing thereby occurs either directly or indirectly via the seals of the impeller. In particular with turbomachines that either compress or expand pure oxygen, an impeller rubbing against the housing can have fatal consequences. The frictional generation of heat or sparking can trigger a catastrophic machine fire.

In order to avoid damage of this type, it is usual to detect axial displacement during operation of the rotor. When a limit is exceeded, suitable safety measures are taken. These can be either triggering an operating alarm or switching off the drive of the rotor. Both measures can also be used simultaneously.

Once the drive has been switched off, the turbomachine spins down. This spin-down can take a rather long time before the rotor actually stops. This is due to the generally very high operating speeds of turbomachines and their high mass moment of inertia. The entire drive train contributes to the high mass moment of inertia.

Due to the rotor mass once accelerated in the axial direction, axial forces also continue to act during the spin-down time. This leads to further axial displacement during spin-down so that damage to the turbomachine can still occur even after an emergency shut-down.

OBJECTS OF THE INVENTION

It is therefore an object of the present invention to provide an improved turbomachine with failure protection.

Another object is the provision of such an improved turbomachine with failure protection that overcomes the above-given disadvantages, in particular that prevents unacceptable axial displacement that would damage the turbomachine on overloading of the axial bearings.

SUMMARY OF THE INVENTION

A turbomachine has according to the invention a housing, a rotor shaft extending along and rotatable about an axis in the housing, and a pair of axially spaced axial-thrust bearings in the housing carrying the shaft and normally only permitting a predetermined small axial displacement of the shaft in the housing. An impeller is rotationally fixed on the shaft. An axially fixed transmission gear is rotationally coupled to the shaft and has an axially directed gear face. A collar fixed axially on the shaft has an axially directed collar face confronting the gear face and normally spaced from the gear face by a clearance equal to more than the predetermined axial displacement. Thus on failure of one of the bearings and axial overtravel of the shaft the gear face and collar face engage each other and limit axial movement of the shaft.

In other words according to the invention the rotor has as additional axial brace at least one brace collar, a clearance between brace-collar faces and run-on faces of a gear being greater than the clearance of the axial bearings. In normal operation the axial bearings do all the axial bracing of the rotor. If overloading of the axial bearings occurs with exceeding of the bearing clearance, the brace collar takes over the necessary axial bracing.

The brace collars are disk-shaped bearing elements that are mounted on the faces of the meshing gears, in that they are formed on the gears or are fixed in a suitable manner as a separate part thereto. A disk of the brace collar, which is attached to the drive gear, radially overlaps a confronting side on one gear and both slide against one another.

According to the invention, two independent axial bracing systems, namely axial bearings and brace collars, are thus used in a parallel manner. Since the brace-collar clearance is greater than the clearance of the axial bearings, the brace-collar faces have no axial bracing function until a certain axial displacement has been exceeded. Both of the axial bracing systems are positioned on the common drive gear of the rotor. They are coordinated with one another such that in normal operation the axial bearing braces the rotor, while the brace collar in normal operation is operated at a spacing from the run-on face on the gear.

In a particularly favorable embodiment of the invention, the axial displacement of the rotor is also detected. When a limit value is exceeded, the drive of the rotor is switched off. According to the invention, the parallel application of two independent axial bracing systems and the detection of axial displacement are thus combined with one another.

The axial displacement can be measured via a proximity sensor. When a limit value is exceeded, the drive of the rotor is switched off.

It is also possible to monitor axial displacement of the rotor indirectly by detecting temperature in the axial bearings. In the bearing elements loaded by axial thrust, heating occurs inside the loaded zones. Axial displacement of the rotor leads to heating in the axial bearings. This heating is recorded by temperature sensors. When a limit value is exceeded, the drive of the turbomachine is switched off.

After the drive has been switched off, the rotor spins down and comes to a stop only after a rather long time. If further axial displacement occurs during this spin-down phase, according to the invention a brace collar takes over axial bracing. This prevents damage to the turbomachine in the spin-down phase.

The brace collar is not loaded during normal operation. It is used only in the event of a fault. The brace collar is thus still fully functional with its first use. The axial brace-collar faces are not stressed until an operational breakdown occurs and thus are still fully loadable. Furthermore, the axial load of the brace collar during the run down becomes smaller with lower speed.

During an operational breakdown, axial bracing of the rotor can be taken over either by two brace collars or only by one brace collar. If two brace collars are used, each of these brace collars has a brace-collar face. Depending on the direction in which the axial displacement of the rotor occurs, the brace-collar face of the one brace collar or the brace-collar face of the other brace collar takes over the bracing function in that it runs against the corresponding run-on face of the gear.

Alternatively, it is also possible that only one brace collar is used, on which both brace-collar faces are present. In the event of a fault, depending on the direction of the axial displacement, thus either the one face or the other face of the brace collar takes over axial bracing.

If only one brace collar is used, it has proven to be particularly advantageous if the run-on faces against which the brace-collar faces run in the event of a fault are formed by the flanks of a groove. Preferably, the groove runs around a gear of the gear transmission.

Both the axial bearings as well as the brace collar are preferably positioned on a common drive gear of a gear transmission of the turbomachine. The brace collars can be attached to the shaft in different manners. Thus they can either be formed on the shaft or fixed to the shaft as a separate part.

Preferably, the clearance between a brace-collar face and the respective run-on face is smaller than the operating gap between the blades of an open impeller and the housing wall of the turbomachine. If an axial bearing fails, the impeller is prevented from rubbing the housing due to these different spacings.

If both impellers have an open construction, an operating gap occurs at each of these impellers. In this case, both brace-collar clearances must be smaller than the operating gaps.

It has proven to be advantageous if the clearance between a brace-collar face and a run-on face is smaller than the sealing clearance between the impeller labyrinth of a closed impeller and its labyrinth clamping ring. This prevents the impeller labyrinth from rubbing a fixedly installed labyrinth clamping ring.

If both impellers are closed, a sealing clearance occurs at each impeller between the impeller labyrinth and the respective fixed labyrinth clamping ring. In this case, the brace-collar clearances must be smaller than the sealing clearances between the impeller labyrinths and the fixed labyrinth clamping rings.

The device according to the invention can be used for different types of turbomachines. For example, only one impeller can be installed on the rotor or impellers can be present on both ends of the drive gear. Both turbocompressor impellers as well as expansion turbine impellers can thus be used. If the rotor has two impellers, they can be turbocompressor impellers or expansion turbine impellers. It is also conceivable that one turbocompressor impeller and one expansion turbine impeller are used at the same time.

Use of the rotor according to the invention has proven to be particularly favorable with the compression or expansion of pure oxygen or of gas mixtures with a high proportion of oxygen. If mixtures of this type are compressed or expanded, even the slightest sparking or friction heat that is produced by impellers rubbing the housing can lead to a catastrophic machine fire.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
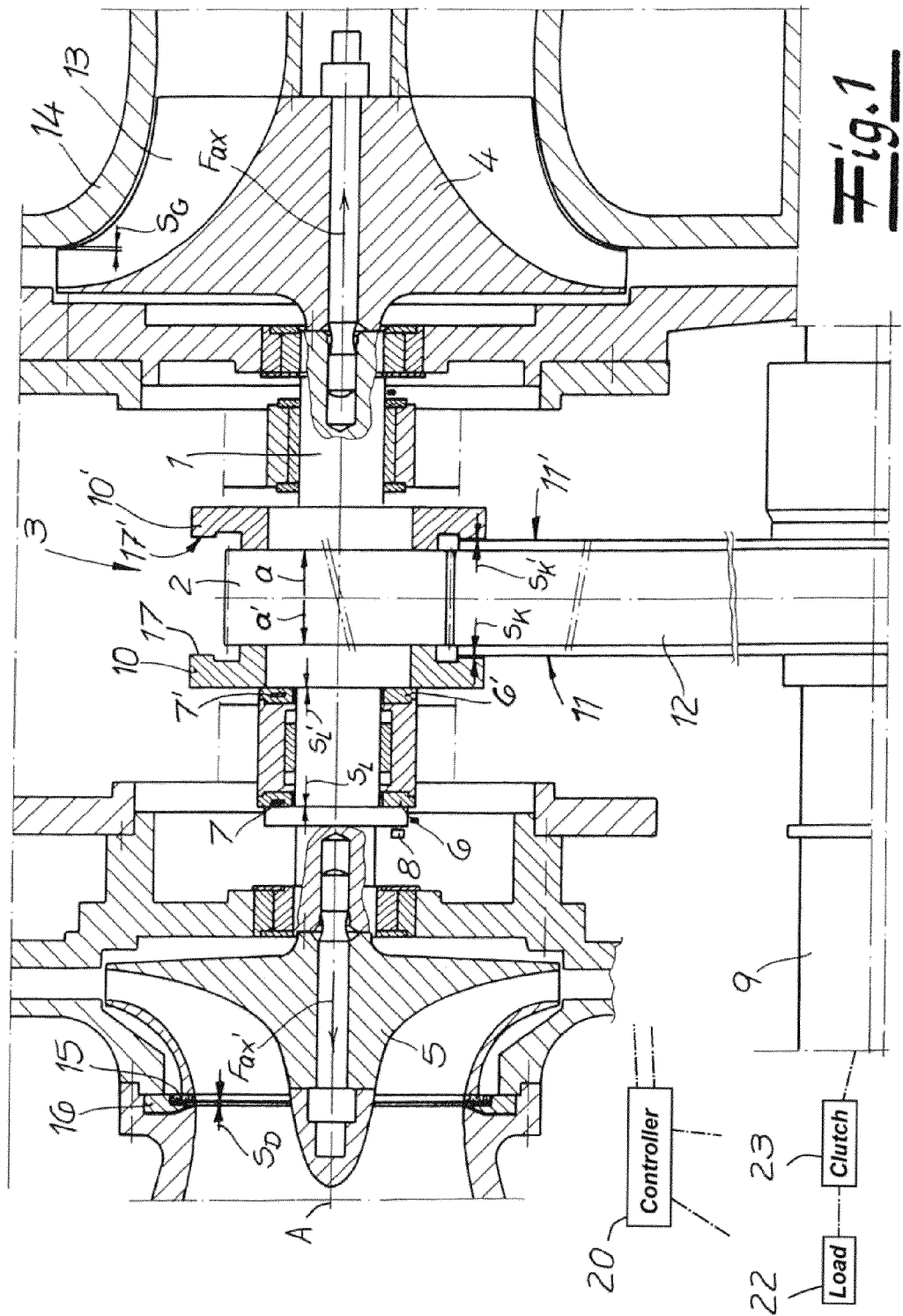
FIG. 1 is a partly diagrammatic axial section through a turbomachine according to the invention with two brace collars.

As seen in FIG. 1 a rotor shaft 1 of a turbomachine is centered on and rotatable in a housing 14 about an axis A and carries a small-diameter drive gear 2 of a gear transmission 3. An open turbocompressor impeller 4 and a closed impeller 5 are axially and rotationally fixed to the rotor shaft 1. Axial-thrust bearings 6, 6' axially brace the shaft 1 in the housing 14. The transmission 3 includes a large-diameter gear 12 meshing with the gear 2 and carried on an output shaft 9 parallel to the rotor shaft 1.

The shaft 1 and both impellers 4 and 5 can move axially as shown by arrows a and a', but during normal operation this displacement is limited by the thrust bearings 6 and 6' to a relatively small displacement $S_L$ or $S_{L'}$. This displacement $S_L$ or $S_{L'}$ is significantly smaller than an axial spacing between blades 13 of, for example, the impeller 4 and an inner surface of the housing 14. Thus during normal operation contact between the impeller 4, and or course also the impeller 5, and the housing 14 is made impossible by the bearings 6 and 6'.

The axial displacement a or a' of the rotor 1 is measured by a noncontact proximity sensor 8 connected to a controller 20. This axial displacement causes heating in the axial bearings 6 or 6' that is detected by temperature sensors 7 or 7' also of course connected to the controller 20. Excessive axial thrust $F_{ax}$ or $F_{ax'}$ can mean that one of the axial bearings 6 or 6' is overloaded. If certain limit values indicating an imminent exceeding of the axial-bearing clearance $S_L$ or $S_{L'}$ are passed, a load 22 on the drive shaft 9 of the gear transmission 3 is disconnected, for instance by opening of a clutch 23. After the load 22 has been relieved, the rotor 1 continues to spin for a while before stopping. Alternately the load 22 could be a drive motor that actively rotates the shaft 1 via the transmission 3 formed by the gears 12 and 2.

If during spin-down of the rotor 1 the still present axial thrust $F_{ax}$ or $F_{ax'}$ causes a further axial displacement, according to the invention the rotor 1 is prevented moving axially beyond a certain point. This is done by a brace collar 10 or 10'. The brace collars 10 or 10' are separate parts attached to the drive gear 2. If a brace collar 10 or 10' takes over the axial bracing function, its respective axially directed brace-collar face 17 or 17' engages a corresponding axially directed run-on face 11 or 11' of the big gear 12 of the transmission 3.

During normal operation, the axial bearings 6 or 6' do all the axial bracing. Only in the event of a problem, with an overloading of the axial bearings, do the brace collars 10 or 10' take on an axial bracing function. This happens because the axial brace-collar clearances $S_K$ or $S_{K'}$ are somewhat larger than the axial-bearing clearances $S_L$ or $S_{L'}$.

The impellers 4 and 5 are prevented from rubbing the is wall of the housing 14 in that the axial brace-collar clearance $S_K$ is much smaller than the operating gap $S_G$ between the blades 13 of the open turbocompressor impeller 4 and the fixed housing 14.

Likewise, the brace-collar clearance $S_{K'}$ is much smaller than the sealing clearance $S_D$ between an impeller labyrinth seal 15 of the closed turbocompressor impeller 5 and a fixed labyrinth clamping ring 16.

Since the axial brace-collar clearances $S_K$ or $S_{K'}$ are greater than the axial-bearing clearances $S_L$ or $S_{L'}$ during normal operation the two planar brace-collar faces 17 or 17' run completely unloaded, that is wholly out of contact with each other. During spin-down of the rotor 1 the brace collars 10 and 10' are able to prevent unacceptable axial displacement of the rotor 1 and thus a brushing by the impeller blades 13 against the housing 14 or a brushing by the impeller labyrinth 15 against the fixedly installed labyrinth clamping ring 16.

Figure 2:
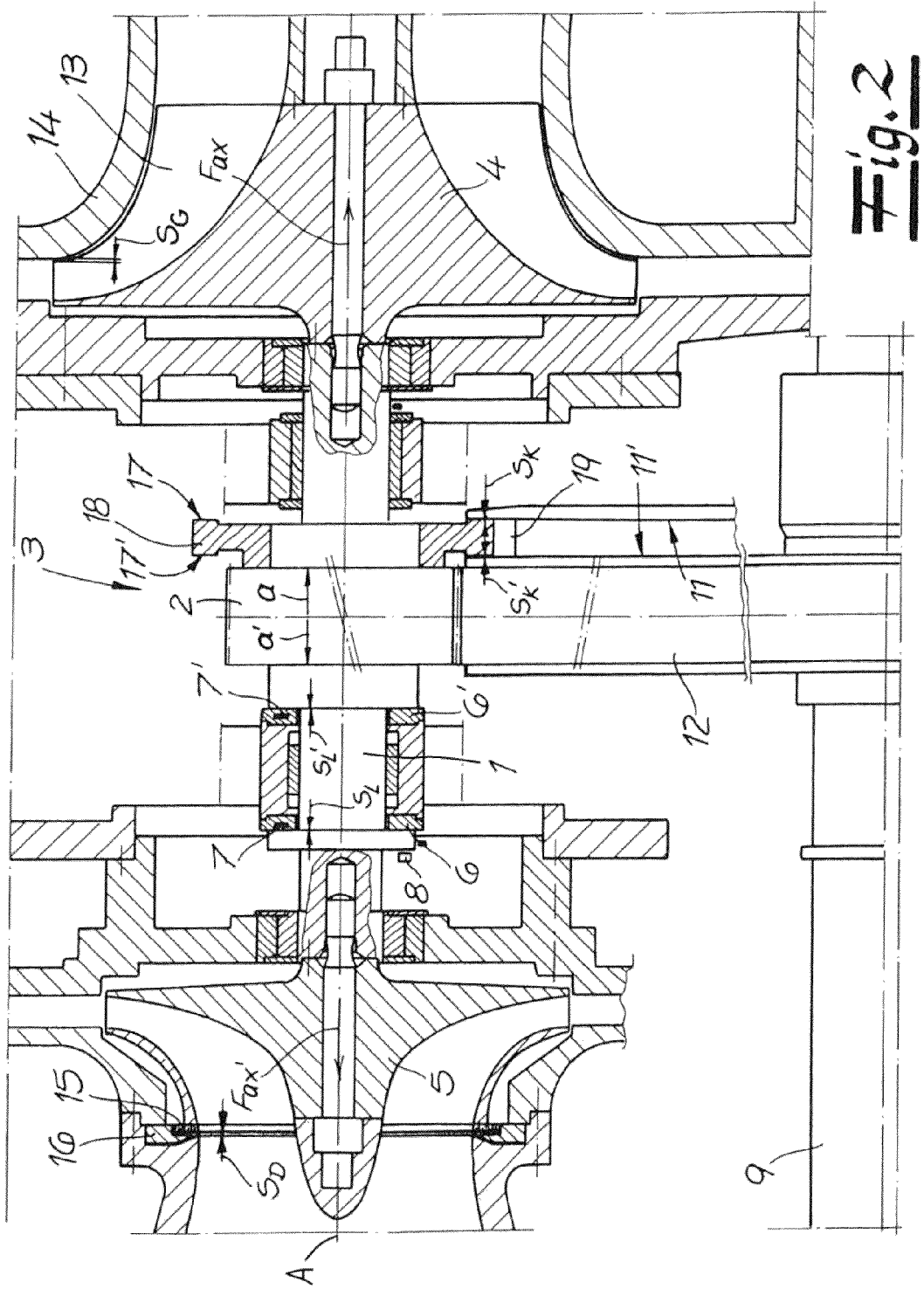
FIG. 2 is a view like of FIG. 1 of a turbomachine with a single brace collar.

In FIG. 2, in the event of the failure of one of the two axial bearings 6 or 6', only one brace collar 18 takes over axial bracing. The planar brace-collar faces 17 or 17' are axially oppositely directed outer faces of the brace collar 18. The brace collar 18 rotates in a radially outwardly groove 19 formed in the gear 12. The planar run-on faces 11 or 11' are formed by confronting side flanks of the groove 19. There is a clearance $S_K$ or $S_{K'}$ between the brace-collar faces 17 or 17' and the run-on faces 11 or 11'. If the axial bearings 6 and/or 6' are overloaded, in fault operation the brace collar 18 takes over the bracing function. One of the brace-collar faces 17 or 17' then runs against the respective run-on face 11 or 11'

I claim:

1. A turbomachine comprising:
    a housing;
    a rotor shaft extending along and rotatable about an axis in the housing;
    a pair of axially spaced axial-thrust bearings in the housing carrying the shaft and normally only permitting a predetermined small axial displacement of the shaft in the housing;
    an impeller rotationally fixed on the shaft;
    an axially fixed transmission gear rotationally coupled to the shaft and having an axially directed gear face; and
    a collar fixed axially on the shaft and having an axially directed collar face confronting the gear face and normally spaced from the gear face by a clearance equal to more than the predetermined axial displacement, whereby on failure of one of the bearings and axial overtravel of the shaft the gear face and collar face engage each other and limit axial movement of the shaft.

2. The turbomachine defined in claim 1 wherein the impeller has blades axially spaced by a predetermined spacing greater than the clearance from an axially confronting surface of the housing, whereby on failure of the bearings the gear face and collar face will engage each other before the impeller blades touch the housing surface.

3. The turbomachine defined in claim 1, further comprising
    sensor means for detecting axial displacement of the rotor shaft; and
    control means connected to the sensor means for, when axial displacement of the rotor shaft exceeds a predetermined limit, disconnecting a load from the gear.

4. The turbomachine defined in claim 1 wherein the clearance and displacement are relatively so dimensioned that if the shaft moves axially more than the predetermined displacement the gear face and collar face axially engage each other.

5. The turbomachine defined in claim 1 wherein the shaft carries two such collars each having one such collar face and the collar faces axially confront each other to opposite axial sides of the gear, the gear having two such gear faces directed axially oppositely away from each other and each axially directly confronting a respective one of the collar faces.

6. The turbomachine defined in claim 5 wherein the collars are rings fixed rotationally and axially on the shaft.

7. The turbomachine defined in claim 6 wherein the shaft carries a small-diameter gear between the collars and meshing with the transmission gear.

8. The turbomachine defined in claim 1 wherein the collar is axially offset from the transmission gear and has two such gear faces directed axially away from each other, the transmission gear being formed with a radially outwardly open groove having axially confronting groove flanks forming a pair of the gear faces, the collar engaging radially into the groove.

9. The turbomachine defined in claim 8 wherein the shaft carries a small-diameter gear adjacent the collar and meshing with the transmission gear.

10. The turbomachine defined in claim 1, further comprising
    a labyrinth seal between the impeller and the housing and having a predetermined clearance greater than the predetermined displacement.

11. The turbomachine defined in claim 1, further comprising
    an input gear fixed on the shaft and meshing with the transmission gear.

12. The turbomachine defined in claim 11 wherein the bearings are both fixed on the shaft immediately adjacent the input gear.

13. The turbomachine defined in claim 1 wherein the shaft carries two such impellers that are axially oppositely directed and that axially flank the bearings and gear.

* * * * *